US009439834B2

(12) United States Patent
Omura et al.

(10) Patent No.: US 9,439,834 B2
(45) Date of Patent: Sep. 13, 2016

(54) MEDICINE DISTRIBUTING SYSTEM

(75) Inventors: Yoshihito Omura, Tokyo (JP); Syunji Ohgaya, Tokyo (JP)

(73) Assignee: TOSHO, INC., Tokyo (JP)

( * ) Notice: Subject to any disclaimer, the term of this patent is extended or adjusted under 35 U.S.C. 154(b) by 190 days.

(21) Appl. No.: 14/003,872

(22) PCT Filed: Mar. 9, 2012

(86) PCT No.: PCT/JP2012/056092

§ 371 (c)(1),
(2), (4) Date: Sep. 9, 2013

(87) PCT Pub. No.: WO2012/121365

PCT Pub. Date: Sep. 13, 2012

(65) Prior Publication Data

US 2013/0345859 A1 Dec. 26, 2013

(30) Foreign Application Priority Data

Mar. 10, 2011 (JP) ................................ 2011-053258

(51) Int. Cl.
*G06F 7/00* (2006.01)
*A61J 3/00* (2006.01)
*A61J 7/00* (2006.01)

(52) U.S. Cl.
CPC ................ *A61J 3/00* (2013.01); *A61J 7/0069* (2013.01)

(58) Field of Classification Search
CPC .................................................. A61J 3/00
USPC .................................................. 700/213
See application file for complete search history.

(56) References Cited

U.S. PATENT DOCUMENTS

2005/0021173 A1* 1/2005 Pinney ................ G06F 19/3462 700/231
2009/0152291 A1 6/2009 Ohmura et al.

(Continued)

FOREIGN PATENT DOCUMENTS

JP 03-240603 10/1991
JP 03-240604 10/1991
JP 2007-209600 8/2007

(Continued)

OTHER PUBLICATIONS

European Search Report dated Sep. 1, 2014, 7 pages.

(Continued)

*Primary Examiner* — Kyle Logan
(74) *Attorney, Agent, or Firm* — Rankin, Hill & Clark LLP

(57) ABSTRACT

A medicine distributing system includes a cassette placement portion for temporary placement of an individual distributing cassette including a large number of cells, a medicine container placement portion for temporary placement of a container for medicines, a medicine transporting device configured to put the medicines into the cells, and a distribution control device configured to acquire individual medicine distribution information to control an operation of the medicine transporting device. The medicine distributing system additionally includes a carrier placement portion for temporary placement of a medicine container carrier capable of housing medicine containers in a vertical column, and a medicine container transporting device configured to transport the medicine containers from the carrier placement portion to the medicine container placement portion.

17 Claims, 13 Drawing Sheets

(56) References Cited

U.S. PATENT DOCUMENTS

| | | | | |
|---|---|---|---|---|
| 2009/0188937 | A1* | 7/2009 | Kim | A61J 7/0069<br>221/312 B |
| 2011/0139293 | A1 | 6/2011 | Yuyama et al. | |

FOREIGN PATENT DOCUMENTS

| | | |
|---|---|---|
| JP | 2007-297066 | 11/2007 |
| JP | 2009-067434 | 4/2009 |
| JP | 2009-067438 | 4/2009 |
| JP | 2009-96557 | 5/2009 |
| JP | 2010-046469 | 3/2010 |
| JP | 4585629 | 11/2010 |
| WO | 2011/018998 | 2/2011 |

OTHER PUBLICATIONS

International Search Report, PCT/JP2012/056092, mailed Jun. 12, 2012, 4 pages.
English Translation of JP 2010-046469, 90 pages.
Japanese Office Action dated Jun. 24, 2014, with English Translation, 5 pages.

* cited by examiner

MEDICINE DISTRIBUTING SYSTEM

TECHNICAL FIELD

The present invention relates to a medicine distributing system capable of automating manual medicine dispensation.

BACKGROUND ART

So-called manual medicine dispensing devices (individual medicine distributing devices) incorporated in a medicine dispensing apparatus have been put into practical use (see Patent Documents 1 and 2, for example). In the manual medicine dispensing device, a spare dispensing cassette (spare individual distributing cassette) is provided to be drawable from a housing of the medicine dispensing apparatus. A large number of small sectioned chambers (cells) are formed in the spare dispensing cassette to be arranged in columns and rows. The cells each have an opened top to allow input of medicines. The lower surface or bottom wall of the cells is formed from an openable bottom plate, such as a shutter, to discharge medicines. In the manual medicine dispensing device (individual medicine distributing device) according to the related art, medicines are manually input and automatically discharged. Thus, in the housing of the medicine dispensing apparatus, a transporting device (conveyor) is provided under the spare dispensing cassette which has been pushed in. The transporting device has cells corresponding to the cells of the spare dispensing cassette, receives medicines discharged from the cells of the spare dispensing cassette in the cells of the transporting device, and feeds a packing device with the medicines in an amount corresponding to one cell of the spare dispensing cassette at a time. In order to allow the medicines in the cells of the spare dispensing cassette to be collectively transported to the corresponding cells of the transporting device, the bottom plates of the cells in the spare dispensing cassette are configured to be collectively opened and closed for all the cells in the spare dispensing cassettes in response to an operation of a shutter lever, for example. The spare dispensing cassette is not provided with a drive source such as a motor.

Such manual medicine dispensing devices are further configured to indicate the number of cells and the names of the medicines (medicine names). The indication of the number of cells (see Patent Document 1, for example) is intended to reduce the mental burden on an operator who is expected not to mistake the number of packages to be manually dispensed. The number of cells to be used is indicated to the operator in charge of manual dispensation by indicating the number of cells through a two-digit LED, indicating the number of column cells and the number of row cells, or indicating the position of the cell by light emission from one of LEDs disposed for the cells, respectively, or by light emission from LEDs disposed around the cell. In addition to the indication of the number of cells, an indication for double dispensation is also provided. The indication of the medicine names (see Patent Document 2, for example) is printed by a printer along with the reference number of a prescription for manual dispensation.

In the manual medicine dispensing devices according to Patent Documents 1 and 2, all the components are incorporated in the medicine dispensing apparatus. Thus, it is only possible to have the medicines individually distributed beforehand to the cells through manual dispensation for the next dispensation at most, and there inevitably occurs a waiting time for subsequent dispensations. Thus, in order to have the medicines distributed to a spare cassette for a number of subsequent dispensations, there also have been developed several manual medicine dispensing devices (medicine distributing systems) provided separately from the medicine dispensing apparatus (see Patent Documents 3 and 4, for example). In the medicine distributing systems according to Patent Documents 3 and 4, a spare dispensing cassette provided in the manual medicine dispensing device incorporated in the medicine dispensing apparatus and formed with a large number of cells is drawn out toward the front of the medicine dispensing apparatus, and further removed from the manual medicine dispensing device to be used. Thus, the medicine distributing system includes the manual medicine dispensing device, a frame member, and a manual dispensing portion. The frame member is provided separately from the manual medicine dispensing device. The manual dispensing portion is provided to the frame member. The manual dispensing portion includes a large number of input ports formed through the manual dispensing portion and disposed in an arrangement corresponding to the arrangement of the cells of the spare dispensing cassette. A variety of improvements have been made to indicate input ports in a manual dispensation range by means of illumination (see Patent Document 3, for example), and to appropriately limit the range in which medicines put into input ports fall into a spare dispensing cassette through individual opening—closing members (see Patent Document 4, for example).

RELATED-ART DOCUMENT

Patent Documents

Patent Document 1: JP03-240604A
Patent Document 2: JP03-240603A
Patent Document 3: JP2007-209600A
Patent Document 4: JP2007-297066A

SUMMARY OF INVENTION

Technical Problem

Thus, also for the manual medicine dispensing devices which complement the automation of the medicine dispensing apparatus, improvements have been made to form a medicine distributing mechanism portion separately from the medicine dispensing apparatus in order to avoid interruption of automatic dispensing operation, and to provide an assisting system configured to prevent a mistake in manual dispensation.

In medicine dispensation, however, automatic processing performed by machines and manual work performed by humans are different in degree of accuracy by an order of magnitude. According to one theory, the frequency of occurrence of a mistake in medicine dispensation is about a hundred times higher with manual work than with automatic processing. In addition, the efficiency with manual work is generally lower than that with automatic processing.

Thus, a technical issue to be addressed is to achieve a medicine distributing system configured to automate manual medicine dispensation in order to improve the accuracy and the efficiency of medicine distribution to a spare dispensing cassette (an individual medicine distributing cassette).

An object of the present invention is to provide a medicine distributing system configured to automate medicine dispensation which has been performed manually in the related art.

Solution to Problem

The present invention provides a medicine distributing system including an input portion, a cassette placement portion, a medicine container placement portion, a medicine transporting device, and a distribution control device. The input portion allows input of individual medicine distribution information for an individual medicine distributing device provided at a medicine dispensing apparatus. The cassette placement portion serves for placement of a spare individual distributing cassette including a plurality of cells each having an opened top and an openable bottom wall to contain one or more medicines. The medicine container placement portion serves for placement of a medicine container containing a plurality of the medicines. The medicine transporting device performs a transporting operation in which a medicine designated according to the individual medicine distribution information is taken out of the medicine container placed in the container placement portion to put the medicine, which has been taken out, through the opened top into the cell of the spare individual distributing cassette placed in the cassette placement portion. The transporting operation is continued until the medicine in an amount designated according to the individual medicine distribution information is completely distributed to the designated cell. The distribution control device controls the operation of the medicine transporting device based on the individual medicine distribution information.

The medicine distributing system according to the present invention is disposed separately from a medicine dispensing apparatus provided with an individual medicine distributing device (corresponding to the existing manual medicine dispensing device). The individual distributing cassette which may be used for the individual medicine distributing device is placed on the cassette placement portion. The medicine container containing individual medicines that may not be distributed by the medicine dispensing apparatus (medicines for individual distribution and manual dispensation) is placed on the medicine container placement portion. Then, the distribution control device acquires relevant individual medicine distribution information (corresponding to the manual medicine dispensation information according to the related art) through data input from the input portion by operating the operating portion or the like, or through data transmission from the medicine dispensing apparatus or a host control device that provides the medicine dispensing apparatus with a pharmaceutical indication. Medicines are taken out of the medicine container and put into the cells of the individual distributing cassette by the medicine transporting device according to control by the distribution control device. Consequently, medicine distribution which has been performed through manual dispensation in the related art is instead performed through automatic processing, which improves the accuracy and the efficiency of medicine distribution to the individual distributing cassette. Thus, according to the present invention, it is possible to achieve a medicine distributing system configured to automate manual medicine dispensation.

The medicine distributing system may further include a carrier placement portion and a medicine container transporting device. The carrier placement portion serves for placement of a medicine container carrier housing a plurality of medicine containers containing the medicines. The medicine container transporting device takes out one of the plurality of medicine containers from the medicine container carrier placed in the carrier placement portion, and places the medicine container on the medicine container placement portion. Providing the medicine container transporting device can increase the amount or the number of types of medicines for the number of medicine containers mounted to the medicine container carrier, which allows even medicines of a large number of types or in a large amount to be automatically distributed to the individual distributing cassette accurately and efficiently.

The medicine containers may each have an opened top, and may be shaped like a dish, for example. In this case, the medicine container carrier may be configured to house the plurality of medicine containers such that the medicine containers are vertically aligned in a column with the opened tops facing upward. The medicine container transporting device may include a carrier elevating device and a reciprocally moving device. The carrier elevating device moves the medicine container carrier in a vertical direction. The reciprocally moving device draws out the medicine container from the medicine container carrier to the medicine container placement portion, and returns the medicine container to the medicine container carrier upon completion of the medicine transporting operation. Use of the medicine container carrier and the medicine container transporting device configured as described above allows the medicines to be contained in several medicine containers according to the medicine type, in appropriate amounts, or the like and allows the medicine containers to be housed in the medicine container carrier in a vertical column when there are a plurality of types of or a large number of medicines to be distributed to the individual distributing cassette. The medicine container carrier is placed in the carrier placement portion, and the medicine containers are successively taken out of the medicine container carrier by the medicine container transporting device. Then, the medicine transporting device automatically executes medicine distribution. Thus, according to the present invention, even medicines of a large number of types or in a large amount can be distributed to the individual distributing cassette accurately and efficiently.

Preferably, the medicine container carrier includes a lock mechanism configured to allow the plurality of medicine containers to be taken out of the medicine container carrier when the medicine container carrier is placed in the carrier placement portion, and to prevent the plurality of medicine containers from slipping out of the medicine container carrier when the medicine container carrier is lifted from the carrier placement portion. Incorporating such a lock mechanism in the medicine container carrier allows the medicine containers to be carried and set casually and adequately.

The configuration of the medicine transporting device is not specifically limited. The medicine transporting device may include a handling robot and an exchangeable unit. The handling robot is driven by the distribution control device. The exchangeable unit is exchangeably provided at a distal end of an arm of the handling robot, and includes one or more medicine holding members to perform a holding operation and a releasing operation under control by the distribution control device. In this case, preferably, the medicine distributing system further includes a unit storage device and a cleaning device. The unit storage device exchangeably stores the plurality of exchangeable units. The cleaning device cleans the exchangeable unit that is stored in the unit storage device and that has been used. The handling robot is easily available, and therefore facilitates forming the medicine transporting device. Storing the plurality of exchangeable units in the unit storage device and causing the cleaning device to clean the exchangeable unit that is stored in the unit storage device and that has been used allows the medicine holding members of the exchangeable unit to be repeatedly utilized. Therefore, the medicine distributing process can be continued inexpensively in a clean state.

Specifically, the exchangeable unit may replaceably include one or more medicine holding members. The one or more medicine holding members may each be a suction nozzle driven by air. In this case, the cleaning device may be a suction cleaning device configured to suction matter attached to the suction nozzle that has been used. In this case, preferably, the suction cleaning device includes a brushing device and a dust collector. The brushing device comes in contact with the suction nozzle to brush off powder of the medicine attached to the suction nozzle. The dust collector suctions the powder of the medicine brushed off by the brushing device. Use of the thus configured suction cleaning device can reliably remove the powder of the medicine from the medicine holding members.

The medicine distributing system may further include a cassette advancing/retracting device configured to convey the individual distributing cassette into and out of the cassette placement portion. This further promotes automation.

The medicine distributing system may further include a cassette transfer device configured to transfer the spare individual distributing cassette from the cassette placement portion to the individual medicine distributing device of the medicine dispensing apparatus. The individual distributing cassette which has been subjected to medicine distribution at the cassette placement portion is transferred to the medicine dispensing apparatus by the cassette transfer device. Thus, not only distribution of the medicines to the individual distributing cassette but also setting of the individual distributing cassette to the medicine dispensing apparatus is automatically processed. Thus, according to the present invention, it is possible to achieve a medicine distributing system configured to set the individual distributing cassette in addition to manually dispensing the medicines.

BRIEF DESCRIPTION OF DRAWINGS

FIG. 1 shows the structure of a medicine distributing system according to a first embodiment of the present invention.

DESCRIPTION OF EMBODIMENTS

A medicine distributing system according to an embodiment of the present invention will be described below with reference to the drawings. In the following description, for the sake of clarity etc., fasteners such as bolts, couplers such as hinges, driving sources such as electric motors, power transmission members such as timing belts, electric circuits such as motor drivers, and electronic circuits such as controllers are not illustrated, and components necessary for or related to description of the present invention are mainly illustrated.

Figure 1A:
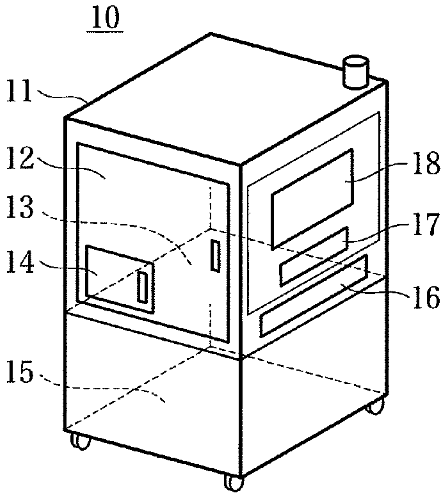
FIG. 1*a* is a perspective view showing the appearance of the medicine distributing system and FIG. 1*b* is a perspective view showing the appearance of a medicine container carrier.
Figure 1B:
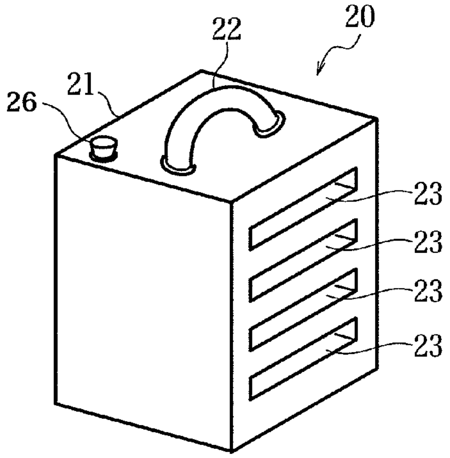
Figure 2:
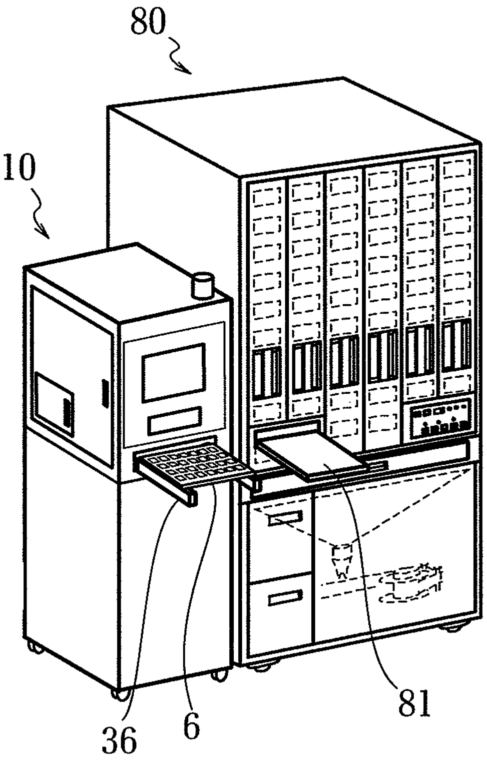
FIG. 2 is a perspective view showing the medicine distributing system and a medicine dispensing apparatus arranged side by side.
Figure 3:
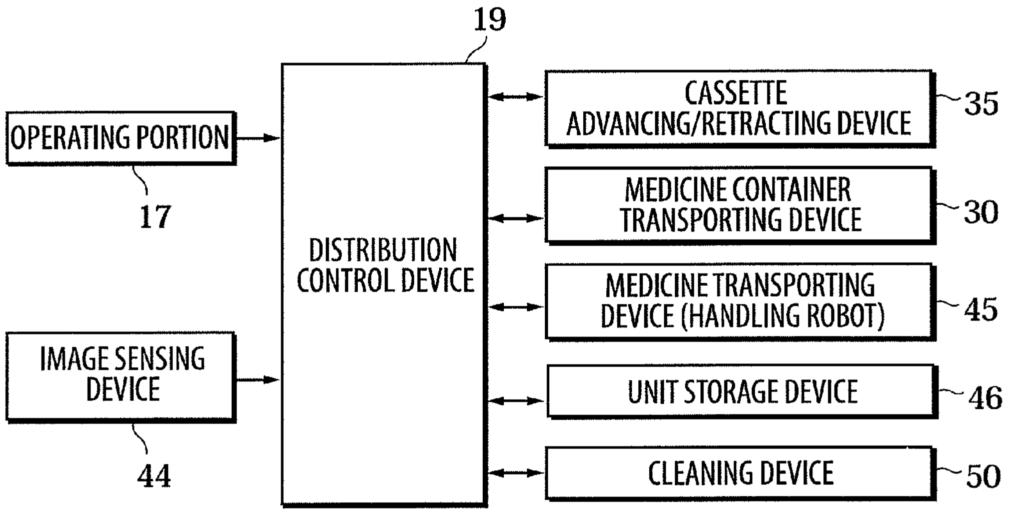
FIG. 3 is a block diagram showing a schematic structure of a control system for the medicine distributing system.
Figure 4:
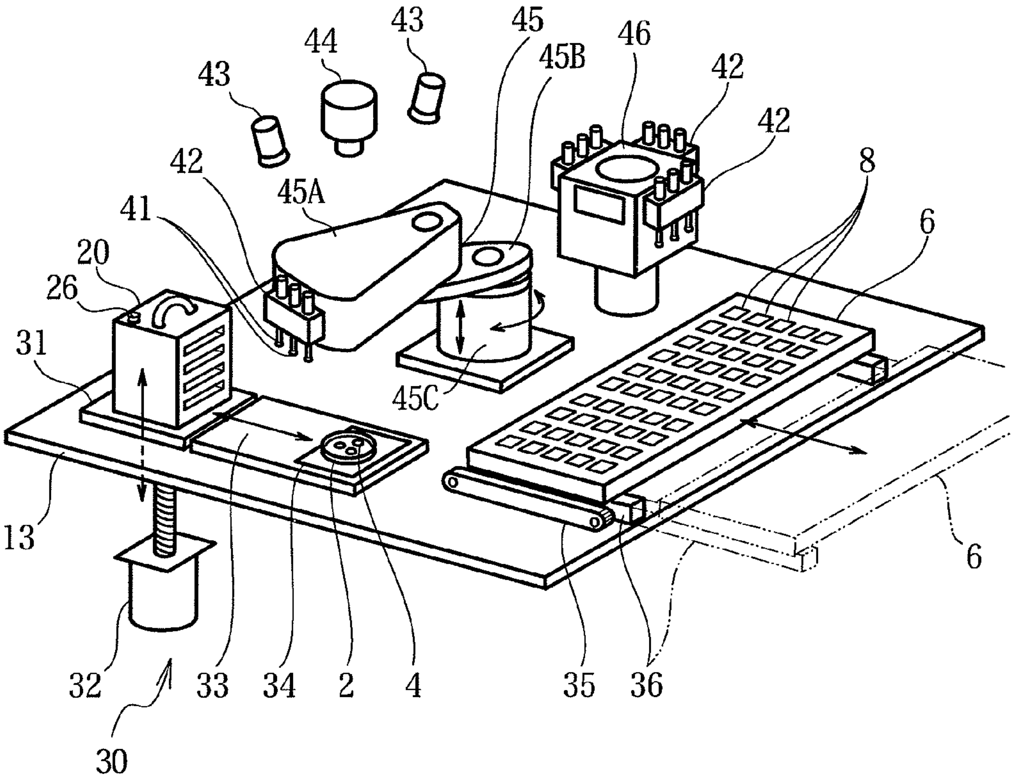
FIG. 4 is a perspective view showing various constituent components mounted to a substrate.

FIG. 1*a* is a perspective view showing the appearance of a medicine distributing system 10 according to a first embodiment of the present invention. FIG. 1*b* is a perspective view showing the appearance of a medicine container carrier 20. FIG. 2 is a perspective view showing the medicine distributing system 10 according to the embodiment and a medicine dispensing apparatus arranged side by side. FIG. 3 is a block diagram showing a schematic structure of a control system for the medicine distributing system 10. FIG. 4 is a perspective view showing various constituent components (31 to 46) mounted onto a board 13.

The medicine distributing system 10 (see FIG. 1*a*) is formed by separating a medicine distributing mechanism portion, which is a component of the manual medicine dispensing device discussed already, from the medicine dispensing apparatus to shorten or avoid interruption of automatic dispensation, and further improving the medicine distributing mechanism portion such that its medicine distribution is performed automatically rather than manually. The medicine distributing system 10 includes a dedicated self-supporting housing 11 to be separate from a medicine dispensing apparatus 80 and a manual medicine dispensing device 81 incorporated in the medicine dispensing apparatus 80 (see FIG. 2).

The internal space of the housing 11 is partitioned into upper and lower spaces by the board 13 having a sufficient mechanical strength. Various mechanical components are disposed in the space above the board 13 and the space immediately below the board 13. An electrical component portion is disposed on a bottom plate 15 located below the board 13.

Although not shown, the electrical component portion houses air piping for vacuum chucks, air piping for a cleaner, etc. in addition to a distribution control device 19 (FIG. 3) and a power supply circuit.

A portion of outer plates of the housing 11 that mainly surrounds the space above the board 13 is provided with a large door 12 for maintenance, a small door 14 for entry and exit of the medicine container carrier 20, a cassette entry/exit port 16 for entry and exit of an individual distributing cassette 6, an operating portion 17 that also serves as an input portion in which several push buttons are disposed, for example, to manually command entry and exit operations of the individual distributing cassette 6 and a start of medicine distribution, and a display 18 formed from a liquid crystal display, for example, to visually display the apparatus operating state and individual medicine distribution information (corresponding to the manual medicine dispensation information according to the related art). Casters for movement and bolts for fixation are also provided on the lower surface of the bottom plate 15.

The medicine container carrier 20, a medicine container 2, and the individual distributing cassette 6 are provided as components to be inserted into and drawn out of the medicine distributing system 10 (see FIGS. 1B and 4), rather than to be fixed to the medicine distributing system 10.

Figure 5A:
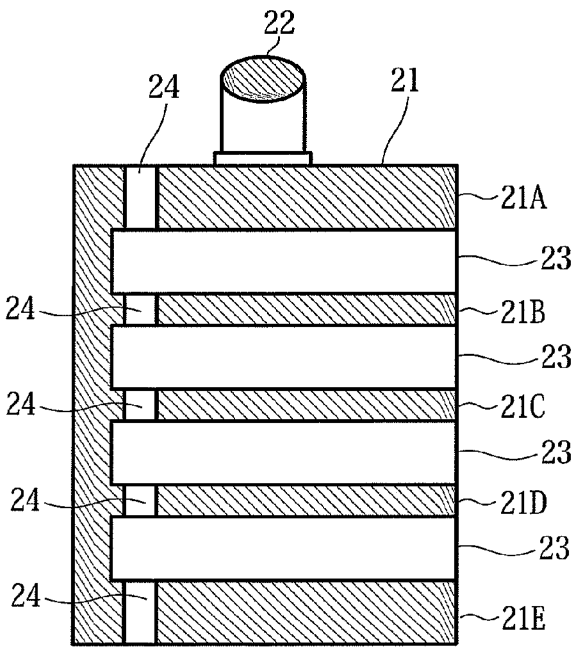
FIG. 5*a* is a vertical cross-sectional view of a box member of the medicine container carrier.
Figure 5B:
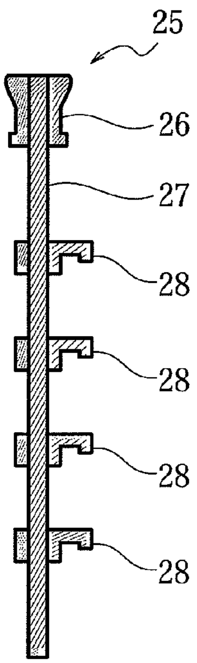
FIG. 5*b* is a vertical cross-sectional view of a lock mechanism.
Figure 5C:
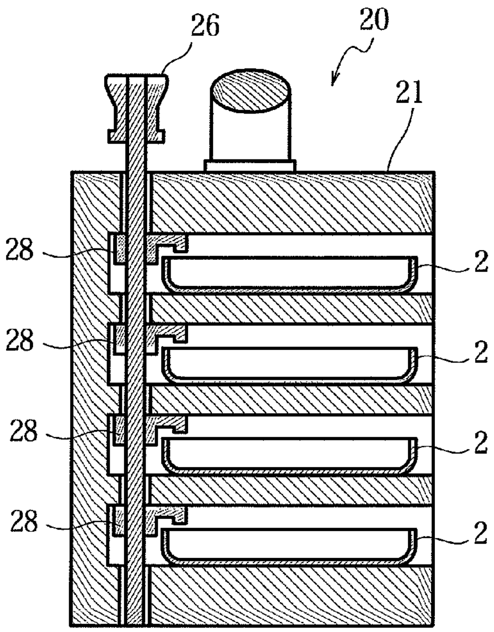
FIGS. 5*c* and 5*d* are each a vertical cross-sectional view of the medicine container carrier housing medicine containers, FIG. 5*c* showing an unlocked state and FIG. 5*d* showing a locked state.
Figure 5D:
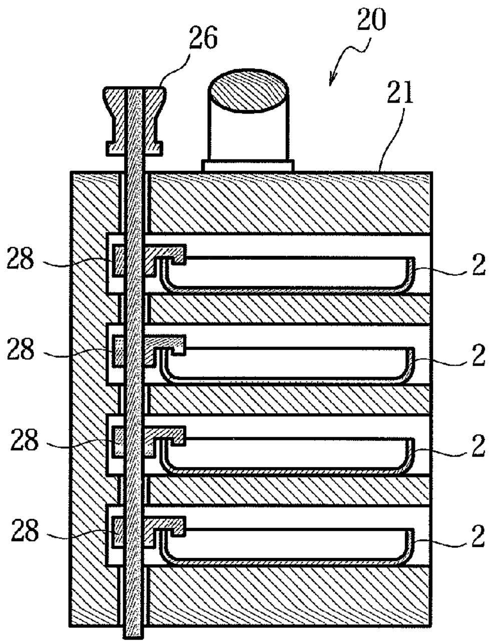

The medicine container carrier 20 (see FIG. 1*b*) includes a box member 21 sized to be inserted and drawn out through the small door 14 when opened, and a handle 22 attached to the box member 21 to be easily portable by hand. A plurality of container housing spaces 23 (in the illustrated example, four container housing spaces 23 arranged in a vertical column) are formed to house the medicine containers 2 one by one. FIG. 5*a* is a vertical cross-sectional view of the box member 21 of the medicine container carrier 20. FIG. 5*b* is a vertical cross-sectional view of a lock mechanism 25. FIGS. 5*c* and 5*d* are each a vertical cross-sectional view of the medicine container carrier 20 housing the medicine containers 2. FIG. 5*c* shows an unlocked state. FIG. 5*d* shows a locked state.

In the box member 21 of the medicine container carrier 20 (see FIG. 5), rod insertion holes 24 are formed to penetrate all the container housing spaces 23, a top plate 21A, a bottom plate 21E, and partition walls 21B to 21D and to be aligned in the vertical direction. A rod 27 of the lock mechanism 25 is inserted through the rod insertion holes 24. A head 26 configured to serve as a knob and prevent slip-off is mounted to the upper end of the rod 27 of the lock mechanism 25. Hooks 28 are mounted to intermediate portions of the rod 27 to be housed in the container housing spaces 23 one by one. As shown in FIG. 5*c*, when the lock mechanism 25 is lifted by pushing up the lower end of the rod 27 or pulling up the head 26 with the medicine container carrier 20 disposed at a medicine container placement portion 34, for example, the lock mechanism 25 is brought into the unlocked state with the hooks 28 disengaged from the medicine containers 2 in the container housing spaces 23. In the unlocked state, the medicine containers 2 are allowed to be taken out of the medicine container carrier 20.

On the contrary, as shown in FIG. 5*d*, when the medicine container carrier 20 is lifted by grasping the handle 22, for example, the lock mechanism 25 is brought into the locked state with the lock mechanism 25 descended by its own weight and with the hooks 28 engaged with the medicine containers 2 in the container housing spaces 23. In the locked state, the medicine containers 2 are prevented from slipping off from the medicine container carrier 20.

The medicine containers 2 (see FIG. 5*c*) are each a small container having an opened top and shaped like a dish such as a circular dish or a rectangular dish. The medicine containers 2 are housed in the four container housing spaces 23 one by one.

Medicines 4 shown in FIG. 4 are typically tablets such as pills. However, the medicines 4 may be any type of individually distributable medicines that may be transported one at a time, and may be medicines in other shapes such as powder medicine or liquid medicine packaged in a capsule or the like, for example.

The individual distributing cassette 6 is a cassette removably attachable to the existing individual medicine distributing device (manual medicine dispensing device) incorporated in the separate medicine dispensing apparatus 80 (FIG. 2). The individual distributing cassette 6 includes a large number of cells 8 for manual medicine dispensation configured to contain medicines for individual distribution. The plurality of cells 8 formed in the individual distributing cassette 6 each have an opened top to receive the medicine 4 during medicine distribution. When medicine distribution is finished in the medicine distributing system 10, a spare individual distributing cassette 6 is transported to the individual medicine distributing device (manual medicine dispensing device) of the medicine dispensing apparatus 80. In order to allow the distributed medicines 4 to be collectively transported from the cells 8 to an actuating portion of the individual medicine distributing device (manual medicine dispensing device), the bottom wall of the individual distributing cassette 6 is configured to be openable. The bottom wall may be provided with opening—closing member.

Figure 6:
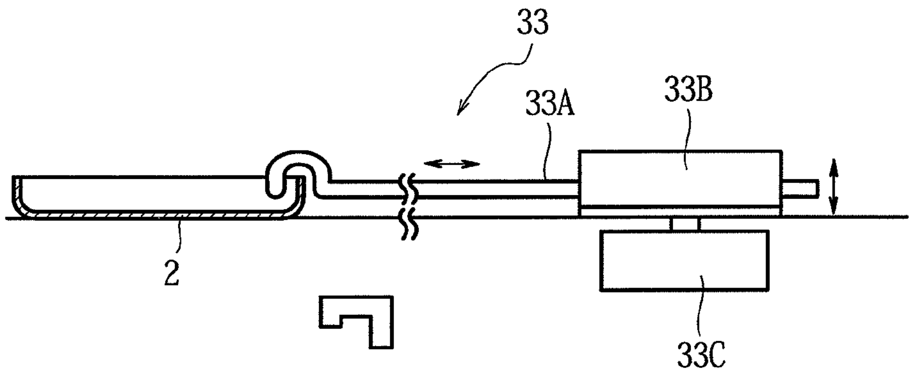
FIG. 6 shows an example of the configuration of a reciprocally moving device.

The internal structure of the medicine distributing system 10 will be described with reference to FIG. 4. In the embodiment, the upper surface of the board 13 is formed with a guide recess (not shown) or the like configured to receive and position the bottom portion of the medicine container carrier 20, and a through hole penetrated by a carrier placement portion 31 configured to allow the medicine container carrier 20 to be temporarily disposed in a stationary posture. A carrier elevating device 32 is provided below the carrier placement portion 31 to determine the position of the carrier placement portion 31 in the vertical direction. A reciprocally moving device 33 is disposed beside the carrier placement portion 31 to allow the medicine container 2 to be drawn out of the carrier elevating device 32 and to allow the medicine container 2 which has been drawn out to be returned to the medicine container carrier 20. As schematically shown in FIG. 6, the reciprocally moving device 33 includes an operating rod 33A, a linear motor 33B, and an elevating linear motor 33C. The operating rod 33A includes a hook provided at the distal end to engage with an edge portion of the medicine container 2. The linear motor 33B reciprocally moves the operating rod 32A. The elevating linear motor 33C moves the linear motor 33B in the vertical direction to cause the hook to engage with and disengage from the edge portion of the medicine container 2. It is a matter of course that the configuration of the reciprocally moving device 33 is not limited to the structure of FIG. 6, and that other structures may be adopted. In the embodiment, the medicine container transporting device 30 is composed of the carrier elevating device 32 and the reciprocally moving device 33.

The medicine container transporting device 30 takes out the medicine containers 2, one at a time, from the medicine container carrier 20 placed in the carrier placement portion 31 to transfer the medicine container 2 to the medicine container placement portion 34 for temporary storage, and returns the medicine container 2 which has been emptied to the medicine container carrier 20. The medicine container transporting device 30 includes the medicine container placement portion 34 which is provided with a guide, a stopper, or the like that is larger than the bottom surface of the medicine container 2 to allow the medicine container 2 containing the medicines 4 to be temporarily disposed in a stationary posture.

The medicine distributing system 10 additionally includes a cassette placement portion 36 and a cassette advancing/retracting device 35 provided on the board 13. The cassette placement portion 36 is a drawing mechanism configured to advance and retract through the cassette entry/exit port 16 for temporary placement of the individual distributing cassette 6. The cassette advancing/retracting device 35 allows the individual distributing cassette 6 on the cassette placement portion 36 to enter and exit through the cassette entry/exit port 16 by expanding and contracting a drawing member of the cassette placement portion 36.

The medicine distributing system 10 further includes a plurality of exchangeable units 42, a lighting unit 43, an image sensing device 44, a medicine transporting device 45, and a unit storage 46. The plurality of exchangeable units 42 are each provided with a plurality of, for example, three, medicine holding members 41 configured to suction and hold the medicines 4 through vacuum suction, for example. The lighting unit 43 illuminates the medicine container 2 placed on the medicine container placement portion 34. The image sensing device 44 images the medicines 4 in the medicine container 2 placed on the medicine container placement portion 34. The medicine transporting device 45 may carry one of the exchangeable units 42 being used. The unit storage 46 may be mounted with a plurality of exchangeable units 42 standing by.

The medicine transporting device 45 includes a general-purpose handling robot, for example. The handling robot includes an arm 45A capable of not only horizontal movement (movement in the X and Y directions) but also vertical movement (movement in the Z direction). The exchangeable unit 42 is mounted to the distal end of the arm 45A. The other end of the arm 45A is rotatably attached to an end of a rotary arm 45B. A servomotor (not shown) is disposed at an articulating mechanism between the arm 45A and arm 45B. A motor 45C has a shaft to which the other end of the arm 45B is coupled. The motor 45C makes both rotational motion and linear motion, as a result of which the arm 45A makes horizontal movement and vertical movement, respectively.

The medicine transporting device 45 automatically performs medicine distribution by moving the distal end of the arm 45A to the medicine container placement portion 34 to take out the medicines 4 in the medicine container 2 placed on the medicine container placement portion 34 through the medicine holding members 41, and moving the distal end of the arm 45A to the individual distributing cassette 6 to put the medicines 4 into the cells 8 of the individual distributing cassette 6 placed on the cassette placement portion 36. In the embodiment, as described in detail later, the medicine holding members 41 are each a suction nozzle that utilizes air.

Figure 7:
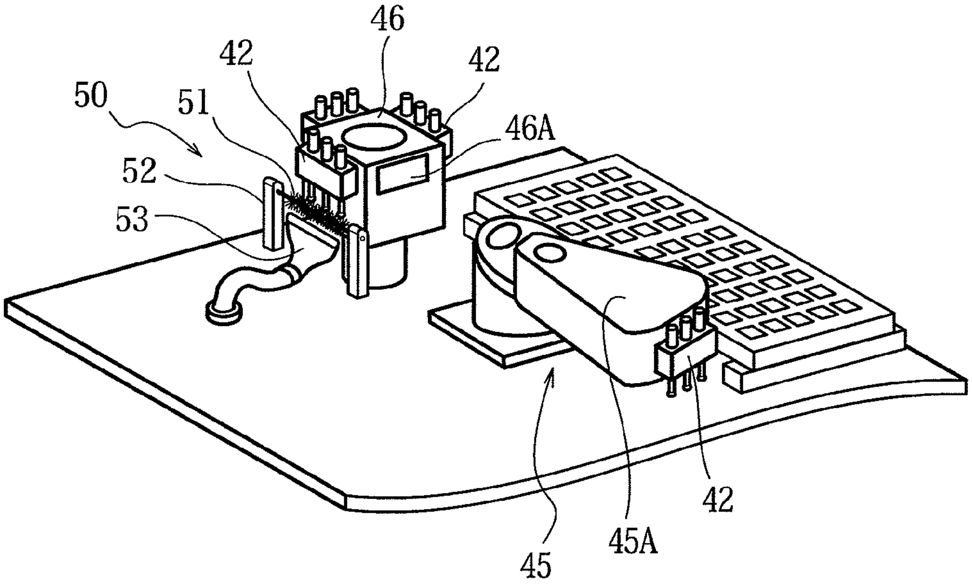
FIG. 7 shows how a cleaning device is mounted.
Figure 8:
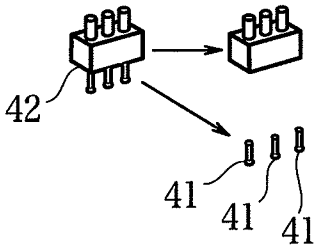
FIG. 8 is an exploded perspective view showing an exchangeable unit from which medicine holding members are removed.

In the embodiment, although not shown FIG. 4, a cleaning device 50 is provided to operate in conjunction with the unit storage 46 as shown in FIG. 7. FIG. 8 is an exploded perspective view showing a state in which the medicine holding members 41 are removed from the exchangeable unit 42. It is a matter of course that the medicine holding members 41 may not be removable from the exchangeable unit 42. To exchange the exchangeable units 42, the exchangeable unit 42 is fitted with a unit holding portion 46A. In the unit storage 46, an engagement mechanism of the unit holding portion 46A is brought into an engaged state to retain the exchangeable unit 42. In such state, when the arm 45A is moved in the direction away from the unit storage 46, the exchangeable unit 42 which has been used is removed from the distal end of the arm 45A. Next, the unit storage 46 is rotated in the clockwise direction to move the exchangeable unit 42 which has been cleaned to a position facing the arm 45A. As a result, the exchangeable unit 42 which has been used is moved to a position corresponding to the cleaning device 50. Then, the arm 45A is moved closer to the unit storage 46 to mount the new exchangeable unit 42 which has been cleaned to the arm 45A. To mount the exchangeable unit 42 which has been cleaned, the engagement mechanism of the unit storage 46 discussed earlier is brought into a disengaged state.

The cleaning device 50 includes a cleaning brush 51 (brushing device) and a dust collector 53. The cleaning brush 51 is rotated about an axis by a rotary brush supporting portion 52. The dust collector 53 includes a suction port directed toward the cleaning brush 51. The cleaning device 50 may be other types of cleaning means, rather than the type showing in the drawing. The cleaning device 50 is configured to clean the medicine holding members 41 mounted to the exchangeable unit 42 which has approached the cleaning device 50 through rotation etc. of the unit storage 46, among the exchangeable units 42 held by the unit storage 46, either standing by to be mounted to the medicine transporting device 45 or returned after use at the medicine transporting device 45.

The distribution control device 19 includes a programmable microprocessor or sequencer, for example. The distribution control device 19 acquires, from a control device for the medicine dispensing apparatus 80 incorporating the individual medicine distributing device (manual medicine dispensing device) or a host control device configured to provide the medicine dispensing apparatus with a pharmaceutical indication, individual medicine distribution information related to the individual medicine distributing device (manual medicine dispensing device) of the medicine dispensing apparatus, if any, through appropriate wired or wireless communication means, and controls an operation of the medicine transporting device 45 and other devices based on the individual medicine distribution information. The handling robot is adequately driven through recognition of the medicines 4 and position verification based on image data obtained with the imaging device 44.

Figure 9:
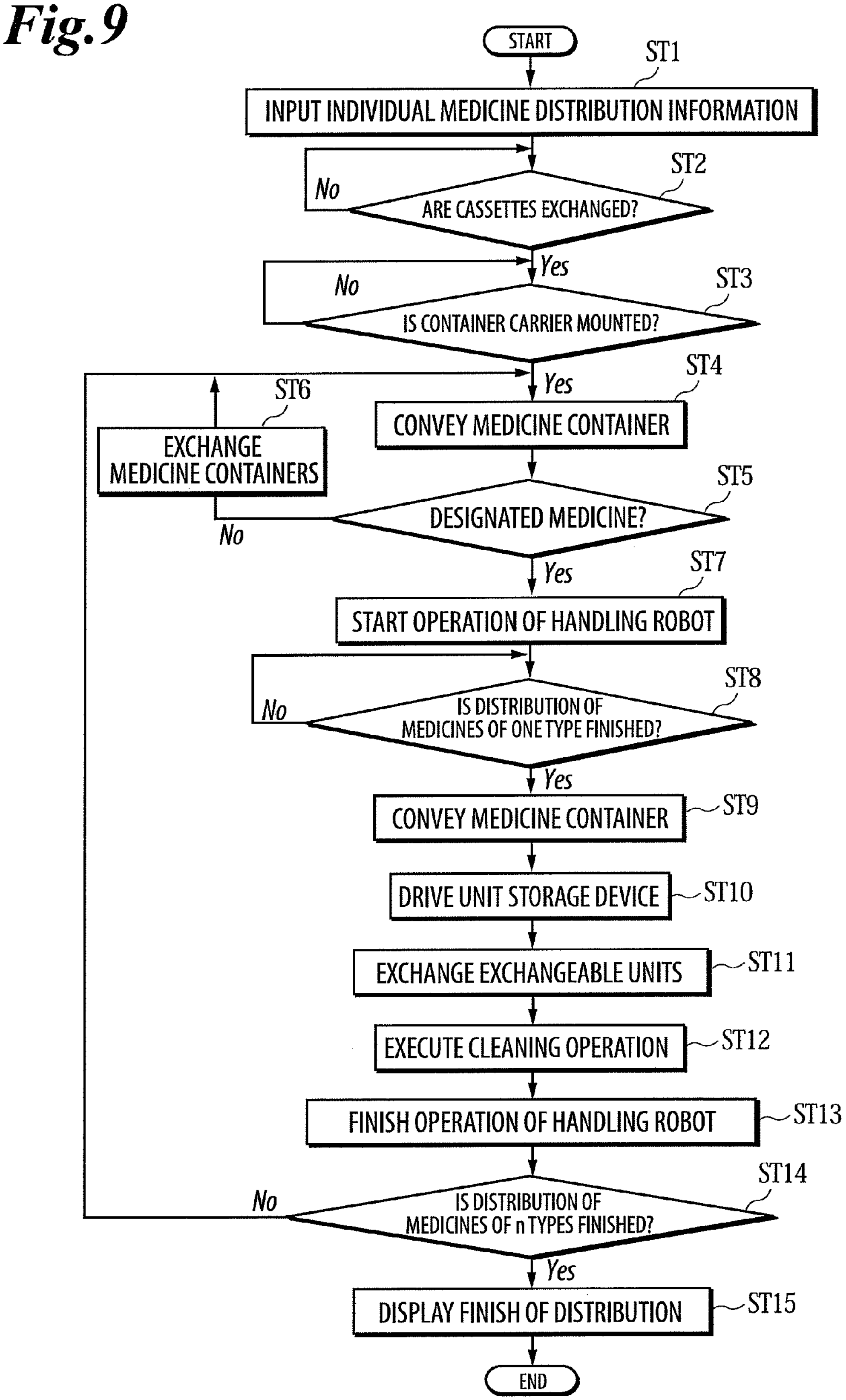
FIG. 9 is a flowchart of an operation of the distributing system.

The content of control performed by the distribution control device 19 will be described with reference to the flowchart of FIG. 9. The medicine distributing system 10 is often used in a dispensing pharmacy or a dispensing department in which one or a plurality of medicine dispensing apparatuses 80 each incorporating the manual medicine dispensing device are installed. If the distribution control device 19 of the medicine distributing system 10 and the control device for the medicine dispensing apparatus 80 or its host control device can communicate with each other via a LAN or the like, individual medicine distribution information is automatically sent to the distribution control device. Otherwise, the individual medicine distribution information is input to the distribution control device 19 by manually operating the operating portion 17 (step ST1). The individual medicine distribution information is data prescribing the medicine type and distribution information for only medicines that may not be automatically dispensed by the medicine dispensing apparatus 80. The individual medicine distribution information is displayed on the display 18, printed on a prescription for manually dispensed medicines, or the like.

When an operator checks the display or the prescription, the operator manually collects necessary medicines 4 from a medicine storage or the like, and separately distributes the necessary medicines in several medicine containers 2 according to the medicine type, for example. Further, the medicine containers 2 are housed in the medicine container carrier 20. After the medicine containers 2 are housed, the medicine container carrier 20 is carried to the medicine distributing system 10 with the medicine containers 2 locked by the lock mechanism 25 not to slip out of the medicine container carrier 20, and the medicine container carrier 20 is placed in the carrier placement portion 31 through the small door 14. When the medicine container carrier 20 is placed in the carrier placement portion 31, the lower end of the rod 27 of the lock mechanism 25 is pushed up by the carrier placement portion 31. This unlocks the medicine container carrier 20 to allow the medicine containers 2 to be taken out.

Before or after the medicine container carrier 20 is set, the operating portion 17 is operated to advance the cassette placement portion 36 out of the cassette entry/exit port 16. After an empty individual distributing cassette 6 is placed on the cassette placement portion 36, the cassette placement portion 36 is lightly pushed, or the operating portion 17 is operated again, to retract the cassette placement portion 36 back to its original position and draw the individual distributing cassette 6 inside through the cassette entry/exit port 16.

Now that preparations have been made for automatic processing of medicine distribution, the operating portion 17 is operated to start automatic processing of medicine distribution (steps ST2 and ST3). Then, the distribution control device controls operations of various members based on the individual medicine distribution information to automatically execute medicine distribution (steps ST4 to ST14).

More particularly, in step ST4, the medicine containers 2 are fed, one at a time, from the medicine container carrier 20 to the medicine container placement portion 34 by the medicine container transporting device 30 under control by the distribution control device 19. The medicine type and the position of the medicines 4 contained in the medicine container placement portion 34 are detected by reading a code or characters based on image data from the image sensing device 44 and further by data processing such as pattern extraction and matching. In the example, if a wrong medicine container has been conveyed, the process returns to step ST4 by way of step ST6 to feed the correct medicine container to the medicine container placement portion 34. It is also possible for the process to directly proceed from step ST4 to step ST7, without providing steps ST5 and ST6, so that the medicine transporting device 45 takes the medicines 4 out of the medicine container 2 in the medicine container placement portion 34 according to the results of comparison between the medicine type and the position detected based on the image from the image sensing device 44 and the individual medicine distribution information and the medicines 4 which have been taken out are put into appropriate cells 8 of the individual distributing cassette 6. Next, in step ST9, the medicine container carrier 20 housing the medicine container 2 which has been emptied is returned to its height at the time when it was set. The unit storage 46 operates in the following step ST10 to exchange the exchangeable units in step ST11. Then, a cleaning operation is executed in step ST12, and an operation of the handling robot is finished in step ST13. In step ST14, it is determined whether or not there are further medicines to be distributed. If there are further medicines to be distributed, the process returns to step ST4 to repeat similar operations. When it is confirmed in step ST14 that medicine distribution indicated by the individual medicine distribution information has been finished, the individual distributing cassette 6 is ejected from the cassette entry/exit port 16, and the display 18 displays an indication of finish of distribution in step ST15.

If the same medicines are contained in a plurality of the same medicine containers, steps ST10 to ST12 are omitted, and it is determined in step ST14 whether or not distribution of medicines in n medicine containers has been finished.

In this way, distribution of the medicines 4 to the individual distributing cassette 6 is efficiently and immediately performed through automatic medicine distribution performed by the medicine distributing system 10. Moreover, the distribution is executed with high accuracy to cause few distribution errors.

Only preparation such as assorting the medicines 4 and setting the individual distributing cassette 6 and post-processing such as taking out the medicine container carrier which has been subjected to medicine distribution and transporting the individual distributing cassette 6 to the manual medicine dispensing device depend on operator's work.

Figure 10:
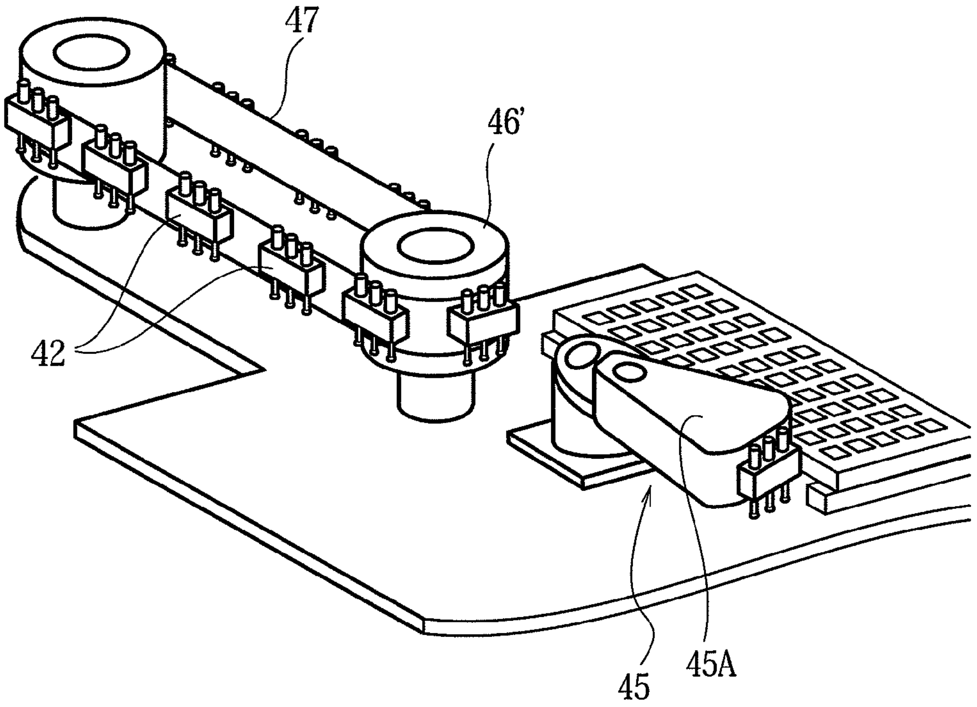
FIG. 10 shows the structure around a unit storage used in a second embodiment of the present invention.

FIG. 10 shows the structure around a unit storage 46' used in a second embodiment of the present invention. In the embodiment, an extension belt 47 configured to extend from the unit storage 46' to a space outside the system is used for a case where a dust collector or the like provided outside the system is used as the cleaning device, or for a case where the medicine holding members 41 are manually cleaned from outside the system. When this structure is used, the exchangeable units 42 can be transported between the outside and the inside of the system. In this case, the number of exchangeable units 42 mountable to the unit storage 46' is advantageously increased.

Figure 11A:
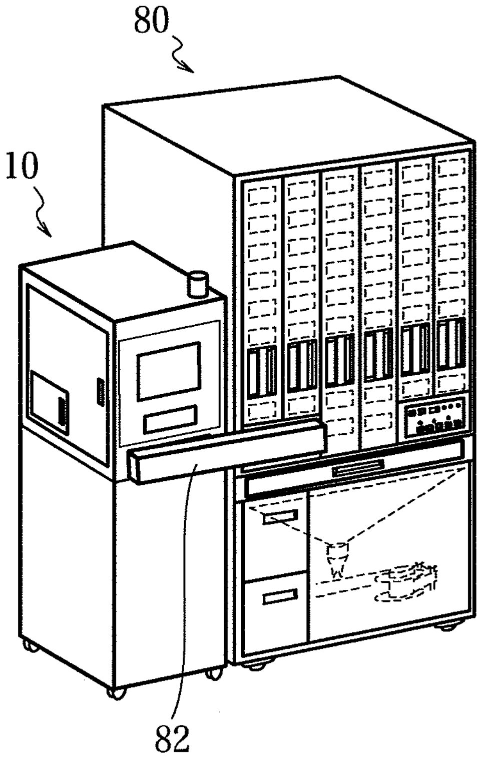
FIG. 11*a* is a perspective view showing the appearance of a medicine distributing system and a medicine dispensing apparatus installed side by side according to an example.
Figure 11B:
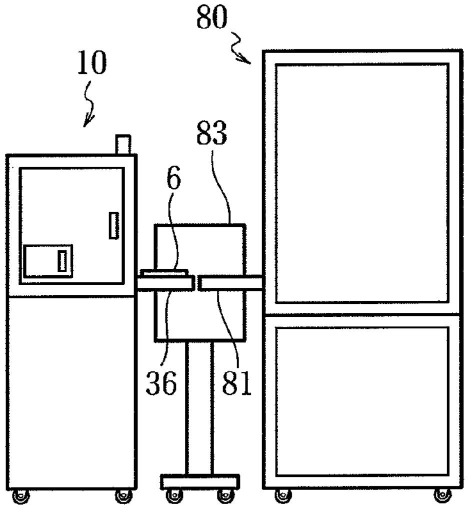
FIGS. 11*b* and 11*c* are each a side view of a medicine distributing system and a medicine dispensing apparatus installed face to face according to another example.
Figure 11C:
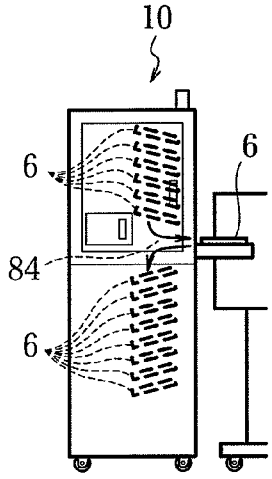

A specific configuration of a medicine distributing system according to a third embodiment of the present invention will be described with reference to the drawings. FIG. 11*a* is a perspective view showing the appearance of the medicine distributing system 10 and the medicine dispensing apparatus 80 installed side by side. FIGS. 11*b* and 11*c* are each a side view of the medicine distributing system 10 and the medicine dispensing apparatus 80 installed face to face.

The configurations shown in FIGS. 11*a* to 11*c* include a cassette transfer device 82, 83 configured to transfer the individual distributing cassette 6 from the cassette placement portion 36 of the medicine distributing system 10 to the manual medicine dispensing device 81 of the medicine dispensing apparatus 80. Thus, transfer of the individual distributing cassette 6 which has been subjected to medicine distribution is also automatically performed.

Figure 12:
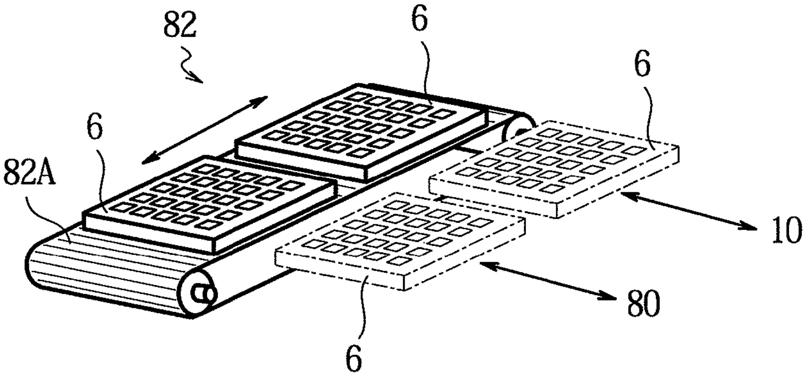
FIG. 12 shows a part of an internal mechanism of a cassette transfer device shown in FIG. 11*a*.

In the configuration of FIG. 11*a*, a large portion of the cassette transfer device 82 is housed in the medicine distributing system 10 and the medicine dispensing apparatus 80. Specifically, as schematically shown in FIG. 12, the cassette transfer device 82 includes a belt conveyor device 82A configured to convey the individual distributing cassette 6. When the individual distributing cassette 6 housed in the medicine distributing system 10 is placed on the belt conveyor device 82A by a horizontal movement mechanism (not shown), the belt conveyor device 82A conveys the individual distributing cassette 6 toward the medicine dispensing apparatus 80. In the medicine dispensing apparatus 80, the individual distributing cassette 6 is moved from the belt conveyor device 82A to the manual medicine dispensing device by a horizontal movement mechanism (not shown) disposed inside the medicine dispensing apparatus 80. In order to exchange the individual distributing cassettes 6, operation opposite to the operation described above is performed to convey the individual distributing cassette 6 which has been used from the medicine dispensing apparatus 80 to the medicine distributing system 10 utilizing the belt conveyor device 82A. In FIG. 12, in order to facilitate understanding, the individual distributing cassettes 6 are shown on paths for the individual distributing cassettes 6.

In the configuration shown in FIG. 11*b*, the medicine distributing system 10 is located in front of the medicine dispensing apparatus 80 with a separate cassette transfer device 83 disposed therebetween. The medicine distributing system 10 and the cassette transfer device 83 can be not only attached to a specific medicine dispensing apparatus 80 but also conveniently attached to several medicine dispensing apparatuses 80.

Figure 13:
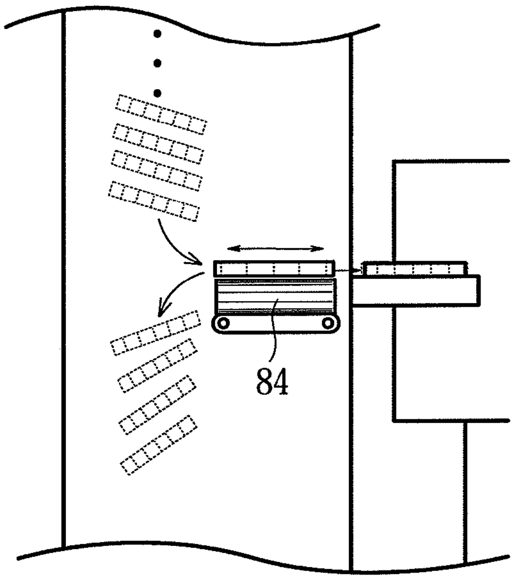
FIG. 13 schematically shows a part of the internal structure of the medicine distributing system of FIGS. 11*b* and 11*c*.

In the configuration shown in FIG. 11*c*, the medicine distributing system 10 additionally includes a cassette feeding mechanism 84 built therein, above which unused empty individual distributing cassettes 6 are stored in a stacked state, and below which individual distributing cassettes 6 which have been used are stored in a stacked state. FIG. 13 schematically shows the cassette feeding mechanism 84. The cassette feeding mechanism 84 is composed of a belt conveyor device that is similar to the belt conveyor device 82A shown in FIG. 12, a horizontal movement mechanism, and so forth. The unused individual distributing cassettes 6 are taken out, one at a time, to be disposed on the cassette placement portion 36. When the individual distributing cassette 6 is subjected to medicine distribution, the cassette feeding mechanism 84 feeds the individual distributing cassette 6 to the medicine dispensing apparatus 80 via the cassette transfer device 83. Then, the cassette feeding mechanism 84 receives the individual distributing cassette 6 which has been used from the medicine dispensing apparatus 80 via the cassette transfer device 83 to store the individual distributing cassette 6 in the lower portion of the medicine distributing system 10. The cassette transfer device 83 includes a belt conveyor device that is similar to that shown in FIG. 12 and that is provided inside thereof. The cassette transfer device 83 is configured to move the individual distributing cassette 6 between the medicine dispensing apparatus 80 and the medicine distributing system 10.

INDUSTRIAL APPLICABILITY

According to the present invention, it is possible to achieve a medicine distributing system configured to automate manual medicine dispensation.

REFERENCE SIGNS LIST

2 medicine container
4 medicine
6 individual distributing cassette
8 cell
10 medicine distributing system
11 housing
12 large door
13 board
14 small door
15 bottom plate
16 cassette entry/exit port
17 operating portion
18 display
20 medicine container carrier
21 box member
22 handle
23 container housing space
24 rod insertion hole
25 lock mechanism
26 head
27 rod
28 hook
31 carrier placement portion
32 carrier elevating mechanism
33 container horizontal transfer mechanism
34 medicine container placement portion
35 advancement/retraction driving mechanism
36 cassette placement portion
41 medicine holding member
42 exchangeable unit
43 lighting unit
44 imaging device
45 medicine transporting device
46 unit storage
47 extension belt
51 cleaning brush
52 rotary brush supporting portion
53 dust collector
80 medicine dispensing apparatus
81 manual medicine dispensing device
82, 83 cassette transfer device
84 cassette feeding mechanism

The invention claimed is:

1. A medicine distributing system for automating manual medicine dispensation comprising:

an input portion configured to allow input of individual medicine distribution information for an individual medicine distributing device provided at a medicine dispensing apparatus;

a cassette placement portion for placement of a spare individual distributing cassette including a plurality of cells each having an opened top and an openable bottom wall to contain one or more medicines;

a medicine container placement portion for placement of a medicine container containing a plurality of the medicines;

a medicine transporting device configured to perform a transporting operation in which a medicine designated according to the individual medicine distribution information is taken out of the medicine container placed in the medicine container placement portion to put the medicine, which has been taken out, through the opened top into the cell of the spare individual distributing cassette placed in the cassette placement portion;

a distribution control device configured to control the operation of the medicine transporting device based on the individual medicine distribution information;

a carrier placement portion for placement of a medicine container carrier housing a plurality of medicine containers containing the medicines; and a medicine container transporting device configured to take out one of the plurality of medicine containers from the medicine container carrier placed in the carrier placement portion, wherein:

the medicine transporting device comprises:

a handling robot driven by the distribution control device, and an exchangeable unit exchangeably provided at a distal end of an arm of the handling robot and including one or more medicine holding members to perform a holding operation and a releasing operation under control by the distribution control device; and the medicine distributing system further comprises:

a unit storage device configured to exchangeably store the exchangeable units, and a cleaning device configured to clean the exchangeable unit that is stored in the unit storage device and that has been used.

2. The medicine distributing system according to claim 1, further comprising:

a cassette advancing/retracting device configured to convey the individual distributing cassette into and out of the cassette placement portion.

3. The medicine distributing system according to claim 1, further comprising:

a cassette transfer device configured to transfer the spare individual distributing cassette from the cassette placement portion to the individual medicine distributing device of the medicine dispensing apparatus.

4. The medicine distributing system according to claim 1, wherein:

the medicine containers each have an opened top and are shaped like a dish;

the medicine container carrier is configured to house the plurality of medicine containers such that the medicine containers are vertically aligned in a column with the opened tops facing upward; and the medicine container transporting device comprise a carrier elevating device configured to move the medicine container carrier in a vertical direction, and a reciprocally moving device configured to draw out the medicine container from the medicine container carrier to the medicine container placement portion, and to return the medicine container to the medicine container carrier upon completion of the medicine transporting operation.

5. The medicine distributing system according to claim 4, further comprising:

a cassette transfer device configured to transfer the spare individual distributing cassette from the cassette placement portion to the individual medicine distributing device of the medicine dispensing apparatus.

6. The medicine distributing system according to claim 4, wherein the medicine container carrier includes a lock mechanism configured to allow the plurality of medicine containers to be taken out of the medicine container carrier when the medicine container carrier is placed in the carrier placement portion, and to prevent the plurality of medicine containers from slipping out of the medicine container carrier when the medicine container carrier is lifted from the carrier placement portion.

7. The medicine distributing system according to claim 6, further comprising:

a cassette transfer device configured to transfer the spare individual distributing cassette from the cassette placement portion to the individual medicine distributing device of the medicine dispensing apparatus.

8. A medicine distributing system for automating manual medicine dispensation comprising:

an input portion configured to allow input of individual medicine distribution information for an individual medicine distributing device provided to a medicine dispensing apparatus;

a cassette placement portion for placement of a spare individual distributing cassette including a plurality of cells each having an opened top and an openable bottom wall to contain one or more medicines;

a medicine container placement portion for placement of a medicine container containing a plurality of the medicines;

a medicine transporting device configured to perform a transporting operation in which a medicine designated according to the individual medicine distribution information is taken out of the medicine container placed in the medicine container placement portion to put the medicine, which has been taken out, through the opened top into the cell of the spare individual distributing cassette placed in the cassette placement portion;

a distribution control device configured to control the operation of the medicine transporting device based on the individual medicine distribution information;

a carrier placement portion for placement of a medicine container carrier housing a plurality of medicine containers containing the medicines;

a medicine container transporting device configured to take out one of the plurality of medicine containers from the medicine container carrier placed in the carrier placement portion;

the medicine containers each have an opened top and are shaped like a dish;

the medicine container carrier is configured to house the plurality of medicine containers such that the medicine containers are vertically aligned in a column with the opened tops facing upward; and the medicine container transporting device comprises:

a carrier elevating device configured to move the medicine container carrier in a vertical direction, and a reciprocally moving device configured to draw out the medicine container from the medicine container carrier to the medicine container placement portion, and to return the medicine container to the medicine container carrier upon completion of the medicine transporting operation.

9. The medicine distributing system according to claim 8, wherein the medicine container carrier includes a lock mechanism configured to allow the plurality of medicine containers to be taken out of the medicine container carrier when the medicine container carrier is placed in the carrier placement portion, and to prevent the plurality of medicine containers from slipping out of the medicine container carrier when the medicine container carrier is lifted from the carrier placement portion.

10. The medicine distributing system according to claim 8, further comprising:

a cassette advancing/retracting device configured to convey the individual distributing cassette into and out of the cassette placement portion.

11. The medicine distributing system according to claim 8, further comprising:

a cassette transfer device configured to transfer the spare individual distributing cassette from the cassette placement portion to the individual medicine distributing device of the medicine dispensing apparatus.

12. The medicine distributing system according to claim 8, wherein:

the medicine transporting device further comprises a handling robot driven by the distribution control device, and an exchangeable unit exchangeably provided at a distal end of an arm of the handling robot and including one or more medicine holding members to perform a holding operation and a releasing operation under control by the distribution control device; and the medicine distributing system further comprises a unit storage device configured to exchangeably store the exchangeable units, and a cleaning device configured to clean the exchangeable unit that is stored in the unit storage device and that has been used.

13. The medicine distributing system according to claim 12, further comprising:

a cassette transfer device configured to transfer the spare individual distributing cassette from the cassette placement portion to the individual medicine distributing device of the medicine dispensing apparatus.

14. The medicine distributing system according to claim 12, wherein:

the exchangeable unit replaceably includes one or more medicine holding members;

the one or more medicine holding members are each a suction nozzle driven by air; and the cleaning device is a suction cleaning device configured to suction matter attached to the suction nozzle that has been used.

15. The medicine distributing system according to claim 14, further comprising:

a cassette transfer device configured to transfer the spare individual distributing cassette from the cassette placement portion to the individual medicine distributing device of the medicine dispensing apparatus.

16. The medicine distributing system according to claim 14, wherein the suction cleaning device comprises a brushing device configured to come in contact with the suction nozzle to brush off powder of the medicine attached to the suction nozzle, and a dust collector configured to suction the powder of the medicine brushed off by the brushing device.

17. The medicine distributing system according to claim 16, further comprising:

a cassette transfer device configured to transfer the spare individual distributing cassette from the cassette placement portion to the individual medicine distributing device of the medicine dispensing apparatus.

* * * * *